United States Patent [19]

Medford et al.

[11] 4,347,685
[45] Sep. 7, 1982

[54] PROTECTIVE COVER AND METHOD OF MAKING SAME

[75] Inventors: Richard D. Medford, Waynesville; Pearison W. Henry, Sylva; Jerry W. Cooper, Waynesville, all of N.C.

[73] Assignee: Dayco Corporation, Dayton, Ohio

[21] Appl. No.: 217,266

[22] Filed: Dec. 16, 1980

[51] Int. Cl.³ ............................................. A01G 13/00
[52] U.S. Cl. ........................................ 47/28 R; 47/29
[58] Field of Search .............................. 47/20, 26–29, 47/31, 17

[56] References Cited

U.S. PATENT DOCUMENTS 3,088,244  5/1963  Commisso ............................ 47/29

FOREIGN PATENT DOCUMENTS 207613  2/1960  Austria ..................................... 47/29
1165212 10/1958  France ..................................... 47/29

Primary Examiner—Robert E. Bagwill
Attorney, Agent, or Firm—Joseph V. Tassone

[57] ABSTRACT

A cover for protecting a plant against weather damage and method of making same are provided wherein such cover comprises a plurality of spaced arch-like supports and a flexible polymeric material fastened to and carried by the supports, and the supports and polymeric material cooperate to define the cover having an inverted roughly U-shaped outline.

24 Claims, 9 Drawing Figures

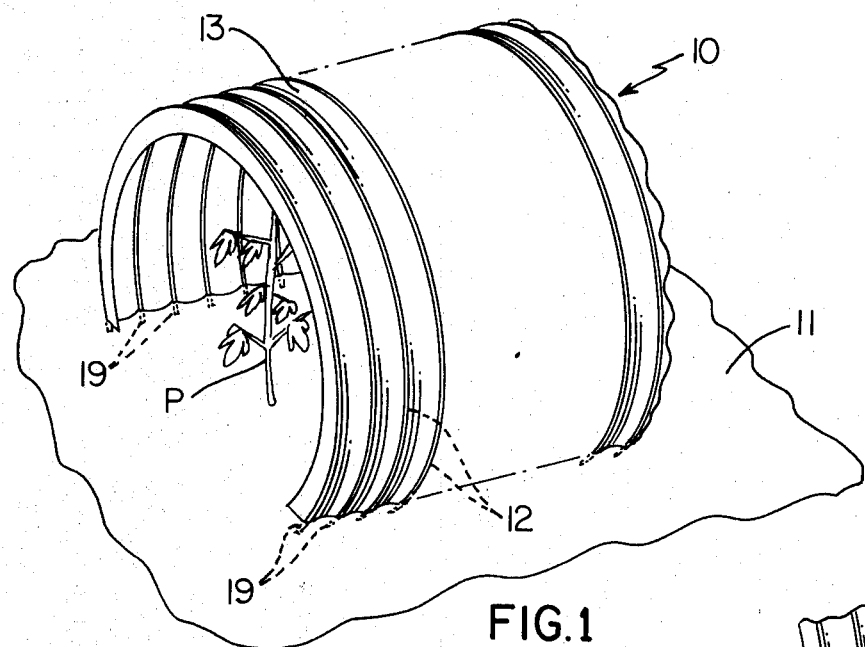
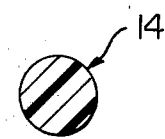
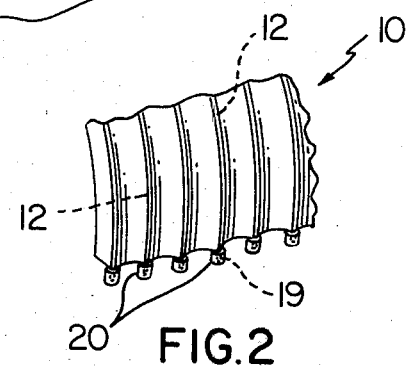
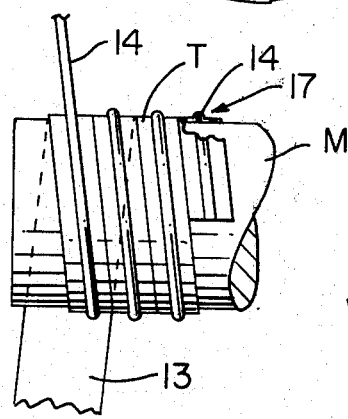
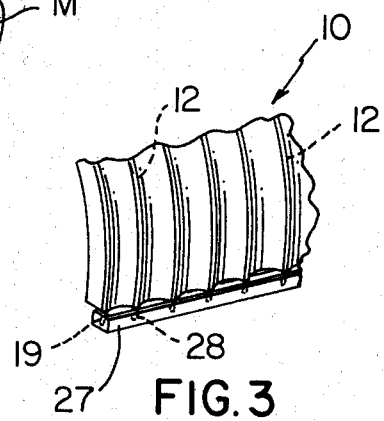
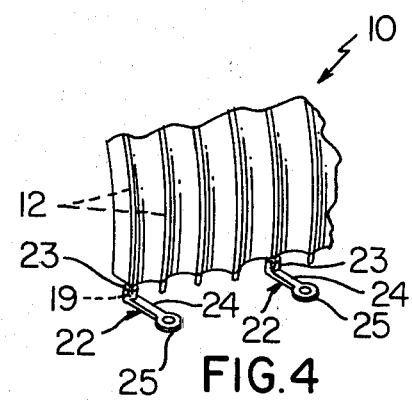
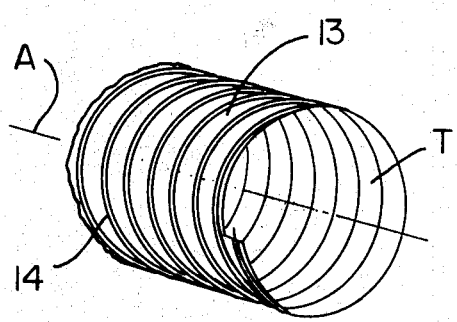
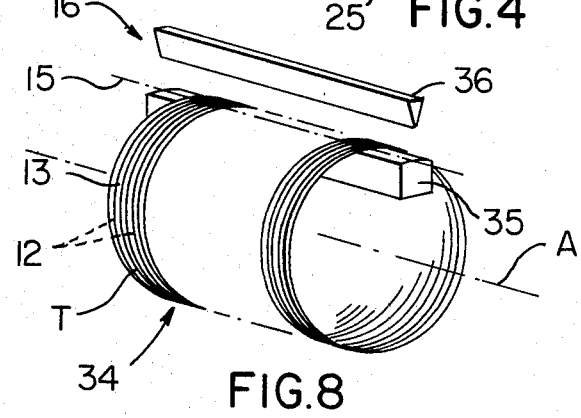

PROTECTIVE COVER AND METHOD OF MAKING SAME

BACKGROUND OF THE INVENTION

1. Field of the Invention

This invention relates to protective covers, such as, a cover for protecting a plant against weather damage and to a method of making such a cover.

2. Prior Art Statement

It is known in the art to provide a cover such as a reinforced cover for protecting a plant against weather damage. For example, when planting various crops such as tomatoes, or the like, it is desirable to plant such crops at the earliest possible time in the Spring, provided the crops are protected against damage by poor weather, such as frost, sleet, snow, heavy rain, wind, and the like.

One technique which has been employed heretofore to enable early planting is to cover one or more plants with a tent or open-ended container or shield. Often a single open-ended container or shield is provided and placed in an inverted manner over a single plant and such container may be made of metal, glass, plastic, paper, or other material. It is standard practice to cover each plant at night with a shield or container and then remove same during the day.

Accordingly, because of the cost of many containers or shields of the type described above, used heretofore, it would be desirable to provide a simple and inexpensive cover for plants which provides the necessary protection against the weather yet could be maintained in position for substantial time periods or removed daily, or at other intervals, at the growers discretion.

It is also known in the art to provide a highly flexible tube made primarily of polymeric material and having a helically wound reinforcing member provided along its axial length; and, it is known to form such a polymeric tube by helically winding a strip of polymeric material with portions of adjoining helical turns in overlapped relation and simultaneously helically winding a reinforcing member in sandwiched relation between the overlapped portions and as disclosed typically in U.S. Pat. No. 4,203,476.

SUMMARY

It is a feature of this invention to provide an improved protective cover particularly adapted for protecting a plant against weather damage.

For example, in accordance with one embodiment of this invention such a cover is comprised of a plurality of spaced arch-like supports and a flexible polymeric material fastened to and carried by the supports, with the supports and polymeric material cooperating to define the cover having an inverted roughly U-shaped outline.

Another feature of this invention is to provide a cover of the character mentioned wherein the polymeric material is a synthetic plastic material which has a wall thickness generally of the order of thousandths of an inch enabling axial collapse of the cover from an extended configuration; and, the arch-like supports are defined by the turns of a helically wound member which has been cut along a rectilinear line engaging all the turns and the plastic material has the inverted U-shaped outline which has been defined by cutting a tube made of the synthetic plastic material along the said rectilinear line.

Another feature of this invention is to provide an improved method of making a cover of the character mentioned.

Therefore, it is an object of this invention to provide an improved cover and method of making same having one or more of the novel features set forth above or hereinafter shown or described.

Other details, features, uses, objects, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is an isometric view illustrating a fragmentary portion of an exemplary cover of this invention which is used for protecting one or more plants against weather damage and such cover is comprised of spaced arch-like supports and flexible polymeric material;

FIG. 2 is a fragmentary view of the cover of FIG. 1 which has cap-like members over exposed ends of its arch-like supports;

FIG. 3 is a view similar to FIG. 2 illustrating the cover of FIG. 1 which uses spacing members to hold its arch-like supports against axial collapse;

FIG. 4 is a view similar to FIG. 2 illustrating the cover of FIG. 1 which employs arch-holding means with certain ones of its arch-like supports;

FIG. 5 is a cross-sectional view of a typical arch-like support of FIG. 1;

FIG. 6 is a cross-sectional view of a modified support which may be used in lieu of the support of FIG. 1;

FIG. 7 is a fragmentary view illustrating a typical tube which may be used to make the cover of FIG. 1;

FIG. 8 is a view illustrating method steps employed in cutting the tube of FIG. 7 to define the cover of FIG. 1; and FIG. 9 is a view illustrating the preferred method of forming the tube of FIG. 7.

DETAILED DESCRIPTION

Reference is now made to FIG. 1 of the drawing which illustrates one exemplary embodiment of a cover of this invention which is designated generally by the reference numeral 10 and such cover is particularly adapted for protecting one or more plants, similar to the illustrated exemplary plant P, against weather damage of the character mentioned previously. The cover 10 is supported on a supporting ground terrain 11 and although only one plant P is visible in FIG. 1, it will be appreciated that such cover 10 may be used in protecting a long row of spaced plants P which are planted with any desired spacing therebetween.

The cover 10 comprises a plurality of arch-like supports each designated generally by the same reference numeral 12 with only a few typical ones of the supports being thus designated and a flexible polymeric material 13 fastened to and carried by such supports. The supports 12 and polymeric material 13 cooperate to define the cover 10 having an inverted roughly U-shaped outline as will be readily apparent from FIG. 1.

The polymeric material 13 is preferably a synthetic plastic material which has a wall thickness generally of the order of thousandths of an inch whereby the U-shaped cover is axially collapsible from an extended configuration thereof. In the illustration of FIG. 1, the cover 10 is shown axially extended so as to provide maximum protection for plants therebeneath. However, the cover 10 is reuseable and is readily collapsed so that its arch-like supports 12 are disposed in more closely adjacent relation and this characteristic may be especially advantageous in storing the cover when it is not in use and in handling such cover.

The arch-like supports 12 are defined by the helical turns, also designated by the reference numeral 12, of a helically wound member which is designated generally by the reference numeral 14, and such helically would member has been cut along a rectilinear line 15 engaging all of the turns 12 and using a cutting device 16 as illustrated in FIG. 8. The plastic material 13 also has an inverted U-shaped outline which has been defined by cutting a tube, such as the tube T of FIG. 7, which is made of the plastic material 13 (and member 14) along the rectilinear line 15.

The tube T illustrated in FIG. 7, from which the cover 10 is preferably made is defined by a ribbon or strip, also designated by the reference numeral 13, of plastic material which has been initially helically wound with portions of adjoining turns in overlapped relation and with the helical member 14 sandwiched between the overlapped portions as shown at 17 in FIG. 9. The overlapped portions, with the member 14 therebetween, are suitably bonded together using any bonding means known in the art. This technique for forming a tubular member is well known in the art and a typical example thereof is disclosed in the above-mentioned U.S. Pat. No. 4,203,476.

The plastic material 13 may be any suitable plastic material and is preferably a thermoplastic material such as polyvinyl chloride, or the like. In addition, it will be appreciated that the member 14 (and hence the arch-like supports 12 defined by the member 14) is preferably made of a metallic material such as a spring steel which has been provided with a suitable vinyl coating 18. The coating 18 serves the dual purpose of preventing corrosion of the metal core of the wire as well as providing a more compatible material between the member 14 and plastic material 13 for bonding these latter two components.

As is known in the art the basically steel member 14 is preformed using suitable rollers before helically winding same with the strip 13 as shown in FIG. 9; and, after the member 14 and synthetic plastic material 13 are cut along the rectilinear line 15 the individual cut turns 12 spring out carrying the attached plastic material with them and define arch-like supports and the roughly U-shape in the cover 10 as illustrated in FIG. 1. The amount of "spring out" of the turns 12 and hence the final shape of the arch-like supports may be controlled by selection of materials and the amount of preforming.

Each of the supports 12 has exposed opposite ends, each designated by the same reference numeral 19, with only a representative few of such ends being thus designated and such exposed ends are defined during cutting of the tube T, as shown in FIG. 8. In the application illustrated in FIG. 1 where the cover 10 is used to cover one or more plants P, the exposed opposite ends 19 are adapted to be pierced within the ground 11 to anchor the cover 10 in position.

However, in some applications of the cover 10 it may be desired to provide cap-like members or caps 20 over the exposed opposite ends 19, as illustrated in FIG. 2. A pair of caps 20 are disposed over the opposite ends 19 of each selected support 12 and in the illustration of FIG. 2 the caps 20 are disposed over the ends 19 of all supports 12; however, for simplicity of presentation the caps 20 are only shown on all supports 12 at one side of the cover 10 with it being understood that identical caps 20 are provided on all supports 12 at the opposite side of such cover.

The cover 10 may also be provided with arch-holding means or members each designated generally by the reference numeral 22 and as shown in FIG. 4. A pair of members 22 may be attached to opposite ends 19 of each selected arch-like support 12 of the plurality of supports and each pair of members 22 is adapted to hold its arch in its roughly U-shaped configuration. In the illustration of FIG. 4 two members 22 are illustrated along one side portion of two supports 12; however, it will be appreciated that two members 22 are also provided and attached to the opposite ends 19 of the supports 12 which are illustrated in FIG. 4 with members 22 in position.

The arch-holding member or means 22 may be of any suitable type and in this example of the invention each member 22 comprises a cap-like portion 23, which is similar to the cap-like members 20 of FIG. 2, and a flap 24 extending from each cap-like portion 23. Each flap 24 has means therein adapted to be operatively associated with a fastener employed to hold each arch in its roughly U-shaped configuration; and, in this example of the invention each flap 24 has a cylindrical opening 25 therethrough which is adapted to receive a fastener such as a fastening stake, or the like, which may be inserted through the opening 25 and utilized to help hold the cover 10 in its U-shaped configuration. The members 22 are used in applications where it is felt that the exposed ends 19 do not provide adequate holding of the cover 10 in its covering position.

Also, while only a few members 22 are illustrated and described in connection with FIG. 4, it will be appreciated that members 22 may be provided on the exposed ends 19 of all supports 12, if desired.

The cover 10 may also be provided with a first and second spacing member each designated by the same reference numeral 27 which are adapted to hold the ends of the arch-like supports 12 against axial collapse. Only one of such spacing members 27 is illustrated in FIG. 3 and such member is associated with the exposed ends 19 of the members 12 at one side of the cover 10; however, it will be appreciated that an identical member is provided on the opposite side of such cover. Each member 27 may be made of any suitable material such as a solid synthetic plastic material which may have the exposed ends 19 embedded therein by piercing action and held by friction. However, it will be appreciated that if desired each end 19 may be suitably fastened by a suitable fastening means such as an adhesive 28, or the like.

The method of making the cover 10 of this invention is of optimum simplicity, and while it is known to form a reinforced cover wherein the enclosing walls of the cover may be made of a rigid material such as metal, glass, plastic, or the like, this invention provides a reinforced cover utilizing a minimum of structural material while still providing the cover at minimum cost. In accordance with this invention, a tube T is defined as illustrated in FIG. 7, and such tube has a central longitudinal axis A. The tube T is defined by polymeric material in the form of strip 13 of synthetic plastic material 13 and the reinforcing member 14 which are helically wound as previously mentioned.

The strip 13 and member 14 may be helically wound employing a stub mandrel M and as is known in the art-FIG. 9. The winding action results in portions of adjoining turns of the strip 13 being disposed in overlapped relation with the member 14 sandwiched between the overlapped portions at 17. The reinforcing member or wire 14 may be provided from a suitable supply roll thereof and the strip 13 may be provided from a suitable supply roll thereof or may be provided from a suitable extrusion apparatus, as desired. Further, the strip 13 may have a preformed groove therein as disclosed in U.S. Pat. No. 4,203,476 or such strip 13 may be a simple flat strip, as shown in FIG. 9. In either case the overlapped portions of adjoining turns of the strip are bonded together utilizing any technique known in the art and with the helically wound member 14 sandwiched therebetween.

The method of this invention comprises the cutting step illustrated in FIG. 8. Accordingly, the helical turns 12 of the member 14 and the polymeric material 13 defining the tube T are cut along the rectilinear line 15 which is parallel to the longitudinal axis A of the tube T. The cutting step results in defining of the dome-shaped cover 10 which has an inverted roughly U-shaped outline and wherein the cut helical turns 12 define a plurality of spaced arch-like supports and the polymeric material 13 is fastened to and carried by the supports.

As previously indicated, the polymeric material is preferably a synthetic plastic material, such as polyvinyl chloride, that is comparatively thin and has a thickness generally of the order of thousandths of an inch and this expression is intended to cover a thickness ranging between 0.001 and 0.010 inch for a plant cover. This use of a thin plastic material and a helically wound member results in the tube T being axially collapsible and as illustrated at 34 in FIG. 8. The capability of axial collapse enables a comparatively longer predetermined length of the tube T to be disposed over a backup anvil 35 and cut with a cutting instrument 16 comprised of a chisel cutter 36 and backup anvil along the rectilinear path or line 15 to thereby cut not only the helically wound member 14 to define a plurality of spaced arch-like supports 12 but also to cut the synthetic plastic material 13 defined by the helically wound strip 13, as previously described. The cutting action may be a simultaneous cutting action for all turns 12 and plastic material 13, as shown, or each turn 12 of the reinforcing member 14 may be cut individually with a smaller cutter followed by cutting of the synthetic plastic material 13 between turns.

The cover 10 may be made of any desired size merely by controlling the diameter of the tube which is controlled by the construction and arrangement of forming rollers used in helically winding the member 14 and the apparatus used to wind the elongated strip 13 in tubular form simultaneously with the member 14. In a typical application, a cover 10 for plants was made from a tube T having an 18 inch diameter and an extended axial length of 25 feet. The member 14 of such a tube was made of 0.070 AWG steel wire which had a 0.010 inch vinyl coating sleeve disposed therearound. The strip 13 was a single ply of polyvinyl chloride 0.006 inch thick and 2½ inches wide. During the helically winding step used in forming the tube T (essentially as illustrated in FIG. 9) a suitable solvent was used between the overlapped portions of the strip 13 to weld or bond same together as well as weld or bond the polyvinyl chloride to the outside surface of the vinyl coated wire 14.

The synthetic plastic material 13 which is utilized may be such that it provides for penetration therethrough of light having the desired wavelength(s) while shielding against penetration of light having undesired wavelength(s). This control may be achieved simply by selecting the desired synthetic plastic material for the strip 13.

In addition to being useable as a cover for plants, the cover 10 may be used to cover equipment of all types, vehicles of all types, as a temporary emergency tent or shelter where more expensive tents might have been used heretofore, as a cover for open ditches, as a toy, and for numerous similar uses. The cover 10 may also be made large enough to serve as a readily portable greenhouse.

It will be appreciated also, that, if desired, the open ends of the U-shaped cover 10 may be provided with suitable cover flaps or doors, as desired, regardless of the application.

The helically wound member has been described above as being a helically wound wire made of a metal; however, it will be appreciated that such member may be made of a suitable polymer, such as, synthetic plastic material which may include nylon, polypropylene, and the like. Such a plastic member is also designated by the reference numeral 14 in FIG. 6 and may be used interchangeably with the wire member in the tube T. The member 14 would be made from a rod of the desired diameter which could be heated during helical winding thereof. The characteristics of the plastic material would be such that upon cooling, the helically wound rod would retain its helical form and upon cutting a tube T using same (as illustrated in FIG. 8) the resulting cover 10 would have a roughly U-shaped outline as illustrated in FIG. 1.

While present exemplary embodiments of this invention, and methods of practicing the same, have been illustrated and described, it will be recognized that this invention may be otherwise variously embodied and practiced within the scope of the followng claims.

What is claimed is:

1. In a cover for protecting a plant against weather damage, said cover comprising a plurality of spaced arch-like supports and a flexible polymeric material fastened to and carried by said supports, said supports and polymeric material cooperating to define said cover having an inverted roughly U-shaped outline, the improvement wherein said cover originally comprised a tube formed of said material and said supports fixed together to define said tube of a cylindrical configuration and having opposed ends, said tube having been cut along a line from one of said opposed ends to the other of said opposed ends to define said cover having said inverted roughly U-shaped outline, said supports being in their final supporting positions without having required relative movement between said supports and said material.

2. A cover as set forth in claim 1 in which said polymeric material is a synthetic plastic material which has a wall thickness generally of the order of thousandths of an inch whereby said U-shaped cover is axially collapsible from an extended configuration.

3. In a cover for protecting a plant against weather damage, said cover comprising a plurality of spaced arch-like supports and a flexible polymeric material fastened to and carried by said supports, said supports and polymeric material cooperating to define said cover having an inverted roughly U-shaped outline, said polymeric material being a synthetic plastic material which has a wall thickness generally of the order of thousandths of an inch whereby said U-shaped cover is axially collapsible from an extended configuration, the improvement wherein said arch-like supports are defined by the turns of a helically wound member which has been cut along a rectilinear line engaging all of said turns, and wherein said plastic material has said inverted U-shaped outline which has been defined by cutting a tube made of said plastic material along said rectilinear line.

4. A cover as set forth in claim 3 in which said tube of plastic material is defined by a strip of plastic material which has been initially helically wound with portions of adjoining turns in overlapped relation with said member sandwiched between said overlapped portions.

5. A cover as set forth in claim 4 in which said plastic material is a thermoplastic material.

6. A cover as set forth in claim 4 in which said plastic material is polyvinyl chloride.

7. A cover as set forth in claim 4 in which said member is made of metallic material.

8. A cover as set forth in claim 4 in which said member is made of synthetic plastic material.

9. A cover as set forth in claim 4 in which each of said supports has exposed opposite ends and further comprising a pair of cap-like members disposed over the opposite ends of each selected support of said plurality of supports.

10. A cover as set forth in claim 4 in which each of said supports has opposite ends and further comprising a pair of arch-holding means attached to the opposite ends of each selected support of said plurality of said supports, said arch-holding means being adapted to enable holding each arch in a roughly U-shaped configuration.

11. A cover as set forth in claim 10 in which each arch-holding means comprises a cap-like member having a flap extending therefrom, each flap having means which is adapted to be operatively associated with a fastener employed to hold each arch in a roughly U-shaped configuration.

12. A cover as set forth in claim 11 in which said means in each flap comprises an opening which is adapted to receive a fastener therethrough.

13. A cover as set forth in claim 4 and further comprising a first and a second spacing member, said first spacing member being attached to the ends of said arch-like supports at one side of said cover, said second spacing member being attached to the ends of said arch-like supports at the other side of said cover, and said spacing members cooperating to hold said cover against axial collapse.

14. In a method of making a cover for protecting a plant against weather damage, said method comprising the step of forming a reinforced cover, the improvement in said method wherein said forming step comprises, forming an elongate tube which has a central longitudinal axis of a polymeric material and a helically wound reinforcing member having a plurality of turns, and cutting said helical turns of said member and said polymeric material of said tube along a rectilinear line parallel to said axis, said cutting step resulting in defining said cover having an inverted roughly U-shaped outline wherein said helical turns define spaced arch-like supports and said polymeric material is fastened to and carried by said supports.

15. A method as set forth in claim 14 in which said step of forming said elongate tube comprises helically winding a strip of said polymeric material with portions of adjoining helical turns in bonded overlapped relation and simultaneously helically winding said reinforcing member in sandwiched relation between said bonded overlapped portions.

16. A method as set forth in claim 15 in which, said step of helically winding said strip comprises helically winding said strip made of a synthetic plastic material which has a wall thickness generally of the order of thousandths of an inch, the formed tube is axially collapsible from an extended configuration thereof, and said cutting step comprises the preparation step of axially collapsing said tube prior to cutting said member and polymeric material along said rectilinear line.

17. A method as set forth in claim 16 in which said cutting step comprises cutting said helical turns and said polymeric material with a chisel type cutter and a backup anvil.

18. A method as set forth in claim 17 in which said cutting step comprises cutting said helical turns and said polymeric material of said tube in a simultaneous manner with said chisel cutter and backup anvil.

19. A method as set forth in claim 16 in which said step of simultaneously helically winding said reinforcing member comprises helically winding a metal wire to define said reinforcing member.

20. A method as set forth in claim 16 in which said step of simultaneously helically winding said reinforcing member comprising helically winding a rod made of a synthetic plastic material while heating same to define the helical configuration therein.

21. A method as set forth in claim 16 in which said step of helically winding said strip of synthetic plastic material comprises helically winding a strip of polyvinyl chloride.

22. A method as set forth in claim 16 in which each of said supports has exposed opposite ends following said cutting step and said method comprising the further step of disposing cap-like members over the opposite ends of each selected support of said plurality of supports.

23. A method as set forth in claim 16 in which each of said supports has exposed opposite ends following said cutting step and said method comprising the further step of attaching arch-holding means to opposite ends of each selected support of said plurality of said supports, said arch-holding means being adapted to hold each arch in its roughly U-shaped configuration.

24. A method as set forth in claim 16 and comprising the further step of providing a first and a second spacing member, fastening said first spacing member to the ends of said arch-like supports at one side of said cover, and fastening said second spacing member to the ends of said arch-like supports at the other side of said cover, said spacing members cooperating to hold said cover against axial collapse.

* * * * *